United States Patent
Wu et al.

(10) Patent No.: US 7,746,062 B2
(45) Date of Patent: Jun. 29, 2010

(54) RADIO FREQUENCY TESTING SYSTEM AND TESTING CIRCUIT UTILIZED THEREBY

(75) Inventors: Cheng-Yu Wu, Taipei Hsien (TW); Tao Yan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 136 days.

(21) Appl. No.: 12/185,110

(22) Filed: Aug. 3, 2008

(65) Prior Publication Data

US 2009/0224786 A1   Sep. 10, 2009

(30) Foreign Application Priority Data

Mar. 7, 2008   (CN)   ......................... 2008 20 300315

(51) Int. Cl.
*G01R 31/00*   (2006.01)
(52) U.S. Cl. ...................................... 324/158.1; 324/95
(58) Field of Classification Search .................. None
See application file for complete search history.

(56) References Cited

U.S. PATENT DOCUMENTS 3,916,349 A * 10/1975 Ranghelli et al. ........... 333/164
4,096,441 A *  6/1978 Schwartz ................. 455/115.4
5,821,815 A * 10/1998 Mohwinkel ................. 330/286

FOREIGN PATENT DOCUMENTS

| CN | 2648742 Y | 10/2004 |
|---|---|---|
| TW | 576507 | 2/2004 |

\* cited by examiner

*Primary Examiner*—Vinh P Nguyen
(74) *Attorney, Agent, or Firm*—Frank R. Niranjan

(57) ABSTRACT

A radio frequency (RF) testing system (100) includes a RF signal source (10) generating RF signals, an antenna (50), a RF testing circuit (40) disposed on a printed circuit board (PCB) (41), a testing probe (20) for receiving the RF signal from the RF testing circuit, and a testing apparatus (30) for testing the RF signals from the testing probe. The RF testing circuit includes a first pad (42), a second pad (44), a transmission line (48), and at least one ground portion (49) parallel to the transmission line. A distance between a first region defined by the first pad and a second region defined by the second pad positioned between the first region and the antenna is equal to one-fourth of the wavelength. During testing, the testing probe is electrically connected to the first pad, and the second pad is electrically connected to ground of the PCB.

16 Claims, 2 Drawing Sheets

RADIO FREQUENCY TESTING SYSTEM AND TESTING CIRCUIT UTILIZED THEREBY

BACKGROUND

1. Field of the Invention

The invention relates to radio frequency testing, and particularly to a radio frequency testing system with a radio frequency testing circuit.

2. Description of Related Art

A radio frequency (RF) element, such as an antenna, is a key element of a wireless communication device. In order to improve quality and performance of the wireless communication device, the radio frequency element is often tested.

Conventionally, during testing the of radio frequency element, a radio frequency connector is used. A socket of the radio frequency connector is arranged on the printed circuit board, and a plug or testing probe electrically connects a testing apparatus and the socket of the radio frequency via a cable. During testing, the socket of the radio frequency connector functions the same as a switch. Namely, the socket of the radio frequency connector can cut off input from the RF signal to the radio frequency element. Thus, all the RF signals are transmitted to the testing apparatus to determine if a power of the radio frequency is acceptable. However, the radio frequency connector is very costly, thereby increasing the overall cost of testing. Additionally, the radio frequency connector increases population of the printed circuit board.

Therefore, a heretofore unaddressed need exists in the industry to overcome the described limitations.

SUMMARY

In an exemplary embodiment, a radio frequency testing system includes a radio frequency signal source generating radio frequency (RF) signals, an antenna, a radio frequency testing circuit disposed on a printed circuit board (PCB), a testing probe receiving the RF signal from the radio frequency testing circuit, and a testing apparatus testing the RF signals from the testing probe. The radio frequency testing circuit includes a first pad, a second pad, a transmission line, and at least one ground portion parallel to the transmission line. A distance between a first region surrounded by the first pad and a second region surrounded by the second pad is equal to one-fourth of the wavelength of the RF signal. The second region is positioned between the first region and the antenna. The testing probe is electrically connected to the antenna via the radio frequency testing circuit. The testing apparatus is electrically connected to the radio frequency testing circuit via the testing probe. During testing, the testing probe is electrically connected to the first pad, and the second pad is electrically connected to ground of the PCB.

Other advantages and novel features will become more apparent from the following detailed description of preferred embodiments when taken in conjunction with the accompanying drawings, in which:

DETAILED DESCRIPTION OF THE EMBODIMENTS

Figure 1:
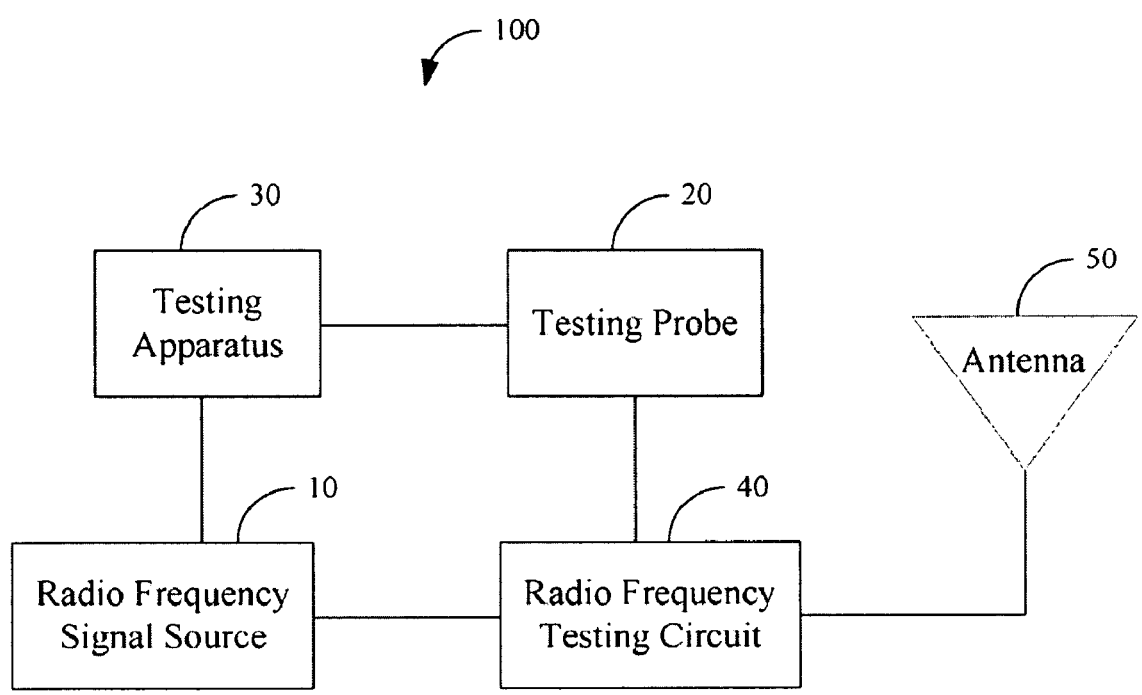
FIG. 1 is a block diagram of a radio frequency testing system of an exemplary embodiment of the invention.

FIG. 1 is a block diagram of a radio frequency testing system 100 of an exemplary embodiment of the present invention. The radio frequency testing system 100 includes a radio frequency signal source 10, a testing probe 20, a testing apparatus 30, a radio frequency testing circuit 40, and an antenna 50.

The radio frequency signal source 10 generates radio frequency (RF) signals and transmits the RF signals to the radio frequency testing circuit 40.

The testing probe 20 is electrically connected to the radio frequency testing circuit 40 and the testing apparatus 30, and receives the RF signals from the radio frequency testing circuit 40. In the embodiment, the RF signals received by the testing probe 20 are designated as received RF signals.

The testing apparatus 30 receives the received RF signals from the testing probe 20, and tests the received RF signals to determine if a power of the antenna 50 is acceptable.

Figure 2:
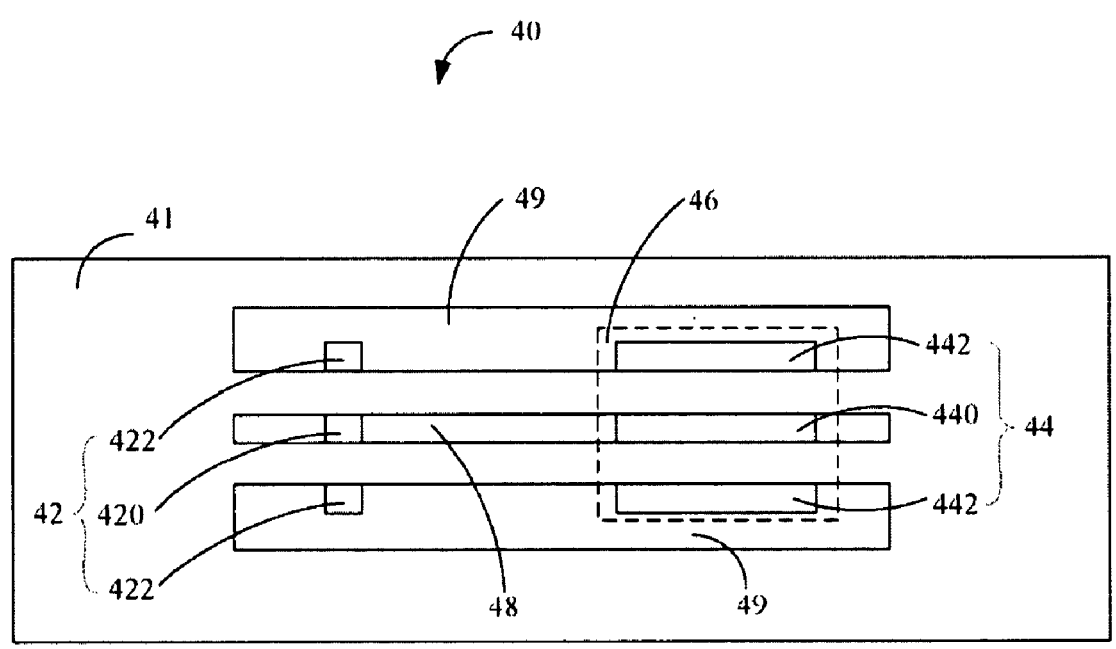
FIG. 2 is a schematic view of a radio frequency testing circuit of the radio frequency testing system of FIG. 1.

FIG. 2 is a schematic view of a radio frequency testing circuit 40 of the radio frequency testing system 100. The radio frequency testing circuit 40 is electrically connected to the radio frequency signal source 10 and the antenna 50. The radio frequency testing circuit 40 is printed on a printed circuit board 41. The radio frequency testing circuit 40 includes a first pad 42 electrically connected to the testing probe 20, a second pad 44, a metal plate 46, a transmission line 48 and a pair of parallel ground portions 49.

In other embodiments, the radio frequency testing circuit 40 comprises at least one ground portion 49 parallel to the transmission line 48.

The transmission line 48 is disposed between and parallel to the two ground portions 49. The transmission line 48 is a microstrip and has impedance values of approximately 50, 75, or 100 ohms ($\Omega$).

The first pad 42 includes a signal pad 420 and a pair of parallel ground pads 422. The second pad 44 includes a signal pad 440 and a pair of parallel ground pads 442. The signal pad 420 of the first pad 42 is positioned between and parallel to the ground pads 422 of the first pad 42. The signal pad 440 of the second pad 44 is positioned between and parallel to the ground pads 442 of the second pad 44. A region surrounded by the signal pad 420 and the ground pads 422 of the first pad 42 is designated as a first region. A region surrounded by the signal pad 440 and the ground pads 442 of the second pad 44 is designated as a second region. The second region is disposed between the first region and the antenna 50. When the transmission line 48 of the printed circuit board 41 is the RF signal's transmission media, a distance between a center of the first region and a center of the second region is equal to one-fourth of the working wavelength of the RF signal.

In the embodiment, the signal pads 420 and 440 are exposed copper of the transmission line 48, respectively. The ground pads 422 and 442 are exposed copper of the ground portions 49, respectively.

The metal plate 46 is disposed on the second region of the second pad 44 to electrically connect the second pad 44 to the ground portions 49 or another ground within the printed circuit board 41. An area of the metal plate 46 slightly exceeds that of the second region. In FIG. 2, the metal plate 46 is represented by broken lines. Because the testing probe 20 is electrically connected to the center of the first region, a distance between the testing probe 20 and the center of the second region is equal to one-fourth of the working wavelength of the RF signal.

During testing, the testing probe 20 is electrically connected to the signal pad 420 of the first pad 42, and the metal plates 46 are disposed on the second pad 44 to electrically connect the signal pad 442 to the ground portions 49 or another ground within the printed circuit board 41. Thus, all RF signals received by the radio frequency testing circuit 40 from the radio frequency signal source 10 are transmitted to the testing apparatus 30 via the testing probe 20, allowing testing apparatus 30 to test the received RF signals to determine if the power of the antenna 50 is acceptable.

Because the metal plates 46 are disposed on the second pad 44 to electrically connect the signal pad 442 to the ground portions 49 or another ground within the printed circuit board 41, the RF signals cannot be transmitted to the antenna 50. Thus, in the embodiment, the second pad 44, along with the metal plate 46, functions the same as a radio frequency connector. Specifically, the second pad 44, along with the metal plate 46, can cut off RF signals input to the antenna 50 to prevent transmission thereof.

Because the distance between the testing probe 20 and the second region of the second pad 44 is equal to one-fourth of the working wavelength of the RF signal, the RF signals input to the antenna 50 can be cut off.

In other embodiments, a probe or cable is utilized rather than the metal plate 46, such that the signal pad 442 of the second pad 46 is electrically connected to the ground portion 49 or another ground within the printed circuit board 41 via the probe or the cable.

In other embodiments, the first pad can include only a signal pad 420 or a signal pad 420 and a ground pad 422.

In other embodiments, the second pad 42 can include only a signal pad 440 and a ground pad 442.

In other embodiments, the signal pads 440 and 420, along with the ground pads 422 and 442, are respectively positioned on the transmission line 48 and the ground portions 49, and are electrically connected to the transmission line 48 and the ground portions 49, respectively.

While embodiments of the present invention have been described above, it should be understood that they have been presented by way of example only and not by way of limitation. Thus, the breadth and scope of the present invention should not be limited by the above-described exemplary embodiments, but should be defined only in accordance with the following claims and their equivalents.

What is claimed is:

1. A radio frequency testing system comprising:
   a radio frequency signal source generating radio frequency (RF) signals;
   an antenna;
   a radio frequency testing circuit disposed on a printed circuit board (PCB), the radio frequency testing circuit comprising a first pad, a second pad, a transmission line, and at least one ground portion parallel to the transmission line, a distance between a first region defined by the first pad and a second region defined by the second pad equal to one-fourth of wavelength of the RF signal, the second region positioned between the first region and the antenna;
   a testing probe for receiving the RF signal from the radio frequency testing circuit, the testing probe electrically connected to the antenna via the radio frequency testing circuit; and
   a testing apparatus for testing the RF signals from the testing probe, the testing apparatus electrically connected to the radio frequency testing circuit via the testing probe;
   wherein, during testing, the testing probe is electrically connected to the first pad, and the second pad is electrically connected to ground of the PCB.

2. The radio frequency testing system as claimed in claim 1, wherein the first pad comprises a signal pad arranged on the transmission line.

3. The radio frequency testing system as claimed in claim 2, wherein the first pad further comprises at least one ground pad arranged on the at least one ground portion.

4. The radio frequency testing system as claimed in claim 3, wherein the second pad comprises a signal pad arranged on the transmission line, and at least one ground pad arranged on the at least one ground portion.

5. The radio frequency testing system as claimed in claim 4, wherein the first pad and the second pad are exposed copper of the transmission line and the ground portions, respectively.

6. The radio frequency testing system as claimed in claim 4, wherein the first pad and the second pad are disposed on and electrically connected to the transmission line and the at least one ground portion, respectively.

7. The radio frequency testing system as claimed in claim 1, wherein the radio frequency testing circuit further comprises a metal plate arranged on the second region of the second pad to electrically connect the second pad to the ground of the PCB.

8. The radio frequency testing system as claimed in claim 7, wherein an area of the metal plate slightly exceeds that of the second region of the second pad.

9. A radio frequency testing circuit disposed on a printed circuit board for testing a power of a radio frequency element via a testing probe and a testing apparatus, the radio frequency testing circuit comprising:
   a first pad defining a first region;
   a second pad defining a second region, wherein a distance between the first region and the second region equals one-fourth of wavelength of a radio frequency (RF) signal, the second pad disposed between the first region and the radio frequency element;
   a transmission line; and
   at least one ground portion parallel to the transmission line;
   wherein, during testing, the testing probe is electrically connected to the first pad, and the second pad is electrically connected to ground of the PCB.

10. The radio frequency testing circuit as claimed in claim 9, wherein the first pad comprises a signal pad arranged on the transmission line.

11. The radio frequency testing circuit as claimed in claim 10, wherein the first pad further comprises at least one ground pad arranged on the at least one ground portion.

12. The radio frequency testing circuit as claimed in claim 11, wherein the second pad comprises a signal pad arranged on the transmission line, and at least one ground pad arranged on the at least one ground portion.

13. The radio frequency testing circuit as claimed in claim 12, wherein the first pad and the second pad are exposed copper of the transmission line and the ground portions, respectively.

14. The radio frequency testing circuit as claimed in claim 12, wherein the first pad and the second pad are disposed on and electrically connected to the transmission line and the at least one ground portion, respectively.

15. The radio frequency testing circuit as claimed in claim 9, further comprising a metal plate arranged on the second region of the second pad to electrically connect the second pad to the ground of the PCB.

16. The radio frequency testing circuit as claimed in claim 15, wherein an area of the metal plate slightly exceeds that of the second region of the second pad.

* * * * *